United States Patent
Oshima (10) Patent No.: US 8,659,876 B2
(45) Date of Patent: Feb. 25, 2014

(54) ELECTRODE FOIL FOR CAPACITOR AND ELECTROLYTIC CAPACITOR USING THE ELECTRODE FOIL

(75) Inventor: Akiyoshi Oshima, Osaka (JP)

(73) Assignee: Panasonic Corporation, Osaka (JP)

( * ) Notice: Subject to any disclaimer, the term of this patent is extended or adjusted under 35 U.S.C. 154(b) by 182 days.

(21) Appl. No.: 13/063,256

(22) PCT Filed: Nov. 9, 2009

(86) PCT No.: PCT/JP2009/005942
§ 371 (c)(1),
(2), (4) Date: Mar. 10, 2011

(87) PCT Pub. No.: WO2010/064359
PCT Pub. Date: Jun. 10, 2010

(65) Prior Publication Data
US 2011/0216478 A1    Sep. 8, 2011

(30) Foreign Application Priority Data
Dec. 1, 2008    (JP) .................................. 2008-305989

(51) Int. Cl.
*H01G 9/04* (2006.01)
*H01G 9/145* (2006.01)

(52) U.S. Cl.
USPC ............ 361/528; 361/523; 361/502; 361/508

(58) Field of Classification Search
USPC ......... 361/303, 305, 502, 503, 508, 509, 511, 361/512, 523, 528
See application file for complete search history.

(56) References Cited

U.S. PATENT DOCUMENTS

| 4,309,810 | A  |   | 1/1982  | Drake |         |
|-----------|----|---|---------|-------|---------|
| 6,351,371 | B1 | * | 2/2002  | Yoshida et al. | 361/528 |
| 7,551,424 | B2 | * | 6/2009  | Kuriyama | 361/528 |
| 7,760,489 | B2 | * | 7/2010  | Fujita et al. | 361/528 |
| 8,300,386 | B2 | * | 10/2012 | Osako et al. | 361/528 |
| 8,351,186 | B2 | * | 1/2013  | Oshima | 361/532 |
| 8,358,497 | B2 | * | 1/2013  | Aoyama et al. | 361/524 |

(Continued)

FOREIGN PATENT DOCUMENTS

| EP | 1426987 A2 | 6/2004 |
|----|------------|--------|
| EP | 2148341 A1 | 1/2010 |

(Continued)

OTHER PUBLICATIONS

International Search Report for Application No. PCT/JP2009/005942, Feb. 2, 2010, Panasonic Corporation.

(Continued)

*Primary Examiner* — Jayprakash N Gandhi
*Assistant Examiner* — Dion Ferguson
(74) *Attorney, Agent, or Firm* — RatnerPrestia (57) ABSTRACT

An electrode foil for capacitor includes a substrate made of valve metal and a rough-surface layer on the substrate. The rough-surface layer includes a base layer on the substrate and a cover layer on the base layer. The base layer includes first fine particles made of valve metal. The cover layer includes second fine particles made of valve metal. The first fine particles have an average particle diameter larger than that of the second fine particles. This electrode foil has the rough-surface layer that can be produced stably by vapor deposition and provides an electrolytic capacitor having a large capacitance.

18 Claims, 7 Drawing Sheets

(56) References Cited

U.S. PATENT DOCUMENTS

| | | |
|---|---|---|
| 2003/0218859 A1* | 11/2003 | Yoshida .................. 361/528 |
| 2008/0239631 A1* | 10/2008 | Fujita et al. .............. 361/528 |
| 2008/0291604 A1* | 11/2008 | Kuriyama ................. 361/502 |
| 2010/0202102 A1* | 8/2010 | Aoyama et al. ........... 361/525 |

FOREIGN PATENT DOCUMENTS

| | | |
|---|---|---|
| JP | 03-196510 A | 8/1991 |
| JP | 06-267803 A | 9/1994 |
| JP | 2003-045753 A | 2/2003 |
| JP | 2008-010490 A | 1/2008 |
| JP | 2008-258404 A | 10/2008 |
| JP | 2008-288295 A | 11/2008 |
| JP | 2008-288296 A | 11/2008 |
| WO | WO 2008/132829 A1 | 11/2008 |

OTHER PUBLICATIONS

Supplementary European Search Report for EP 09830130 dated Jan. 4, 2013.

\* cited by examiner

ELECTRODE FOIL FOR CAPACITOR AND ELECTROLYTIC CAPACITOR USING THE ELECTRODE FOIL

This Application is a U.S. National Phase Application of PCT International Application PCT/JP2009/005942.

TECHNICAL FIELD

The present invention relates to an electrode foil for capacitor to be used for an electrolytic capacitor.

BACKGROUND ART

Along with the development of high-frequency electronic apparatuses, there have been strong demands for capacitors serving as one kind of electronic apparatuses that have a superior impedance characteristic in a high-frequency region in comparison with the conventional capacitor, and in order to address these demands, various kinds of solid electrolytic capacitors in which a conductive polymer having a high electric conductivity is used as a solid electrolyte have been examined.

Moreover, in recent years, with respect to solid electrolytic capacitors to be used around a CPU of a personal computer, there have been strong demands for miniaturization of the electrolytic capacitors with a large capacitance, and there have also been demands for them to have a low equivalent series resistance (ESR) so as to respond to high frequencies and a low equivalent series inductance (ESL) that is superior in removing noise as well as in transient response.

Figure 9:
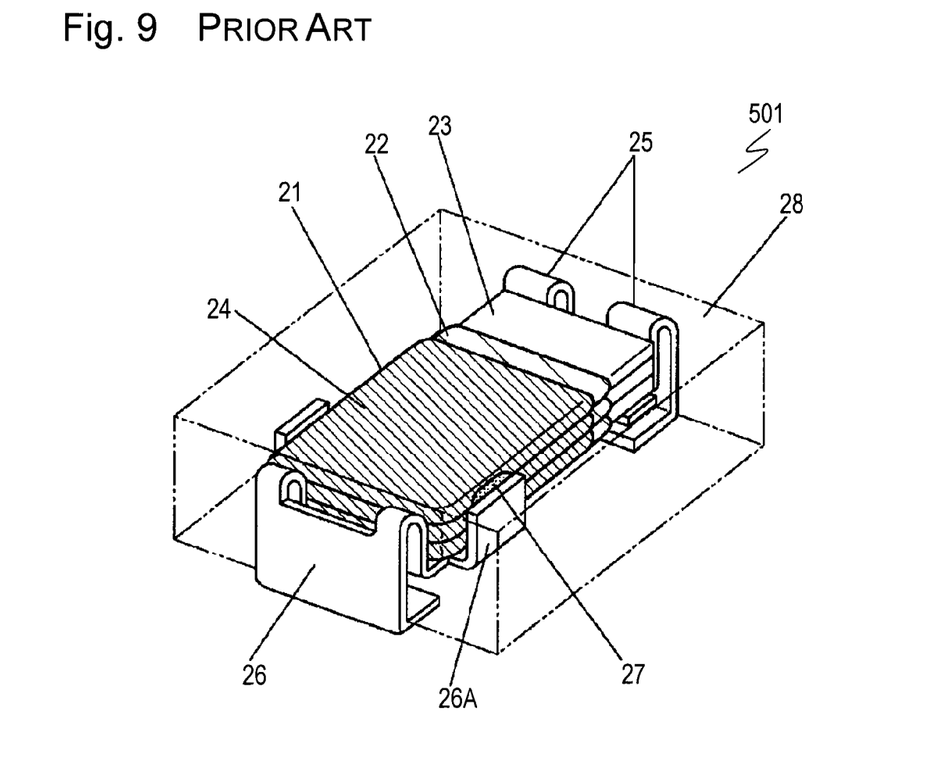
FIG. 9 is a perspective view of a conventional electrolytic capacitor.
Figure 10:
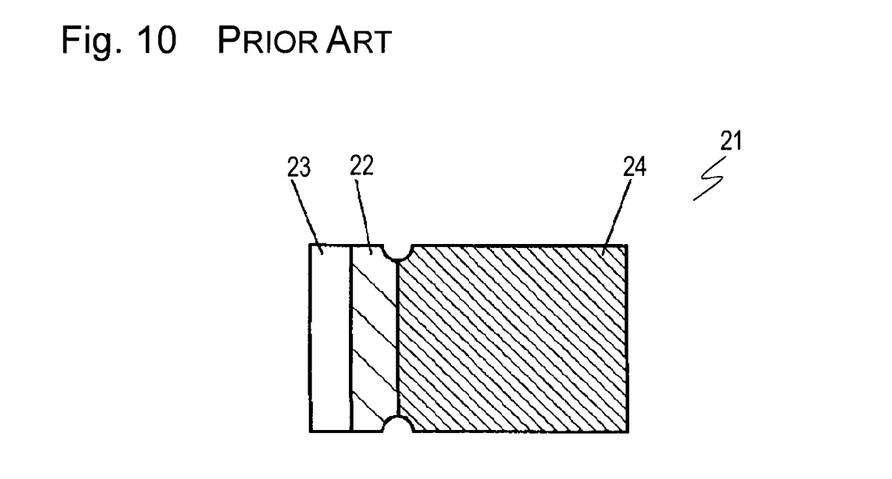
FIG. 10 is a plan view of a capacitor element of the conventional electrolytic capacitor.

FIG. 9 is a perspective view of conventional solid electrolytic capacitor 501 described in Patent Literature 1. FIG. 10 is a plan view of capacitor element 21 of solid electrolytic capacitor 501. Capacitor element 21 includes an electrode foil that is an anode made of a valve metal foil, such as an aluminum foil, and a dielectric oxide layer formed on a surface of the electrode foil. The surface of the electrode foil is roughened. The electrode foil is separated into anode portion 23 and a cathode formation portion by insulating resist 22 formed on the dielectric oxide layer. Capacitor element 21 further includes a solid electrolyte layer made of a conductive polymer formed on the dielectric oxide layer on the cathode formation portion of the electrode foil, and a cathode layer formed on the solid electrolyte layer. The cathode layer includes a carbon layer formed on the solid electrolyte layer, and a silver paste layer formed on the carbon layer. The solid electrolyte layer and the cathode layer constitute cathode portion 24. The electrode foil has a rectangular shape extending in a longitudinal direction, and capacitor element 21 has a flat-plate shape. Anode portion 23 and cathode portion 24 are arranged in the longitudinal direction while resist 22 is provided between portions 23 and 24.

Anode common terminal 25 is connected to anode portion 23 of capacitor element 21. A plurality of capacitor elements 21 are stacked on anode common terminal 25, and anode portions 23 of capacitor elements 21 are joined to one another by a joining method, such as laser welding.

Cathode common terminal 26 is connected to cathode portion 24 of capacitor element 21. Bent portions 26A are formed by bending two sides of an element mounting portion of cathode common terminal 26 upward. The element mounting portion of cathode common terminal 26 and cathode portions 24 of capacitor elements 21 are electrically connected to each other by a conductive adhesive, and cathode portions 24 of capacitor elements 21 are also electrically connected to one another by a conductive adhesive. Bent portions 26A and cathode portion 24 are joined by conductive adhesive 27 so as to be electrically connected to each other.

Capacitor elements 21 are unitarily covered with insulating package resin 28, with one portion of each of anode common terminal 25 and cathode common terminal 26 being exposed to an outer surface. Portions of anode common terminal 25 and cathode common terminal 26 which extend outside from package resin 28 are bent toward the bottom surface along package resin 28 so that surface mounting solid electrolytic capacitor 501 having the anode terminal portion and the cathode terminal portion formed on the bottom surface portion is configured.

In conventional solid electrolytic capacitor 501, in an attempt to increase its capacitance by enlarging the surface area per unit area of the electrode foil, the surface of the electrode foil made of an aluminum foil of capacitor element 21 is roughened by an etching process. From the viewpoints of the etching technique and the mechanical strength of the aluminum foil, there is a limitation in further increasing of the surface area by the etching process, and it is difficult to increase the capacitance beyond this limitation.

CITATION LIST

Patent Literature

PATENT LITERATURE 1: Japanese Patent Laid-Open Publication No. 2003-45753

SUMMARY OF THE INVENTION

An electrode foil for capacitor includes a substrate made of valve metal and a rough-surface layer on the substrate. The rough-surface layer includes a base layer on the substrate and a cover layer on the base layer. The base layer includes first fine particles made of valve metal. The cover layer includes second fine particles made of valve metal. The first fine particles have an average particle diameter larger than that of the second fine particles.

This electrode foil has the rough-surface layer that can be produced stably by vapor deposition and provides an electrolytic capacitor having a large capacitance.

DESCRIPTION OF PREFERRED
EMBODIMENTS cl Exemplary Embodiment

Figure 1:
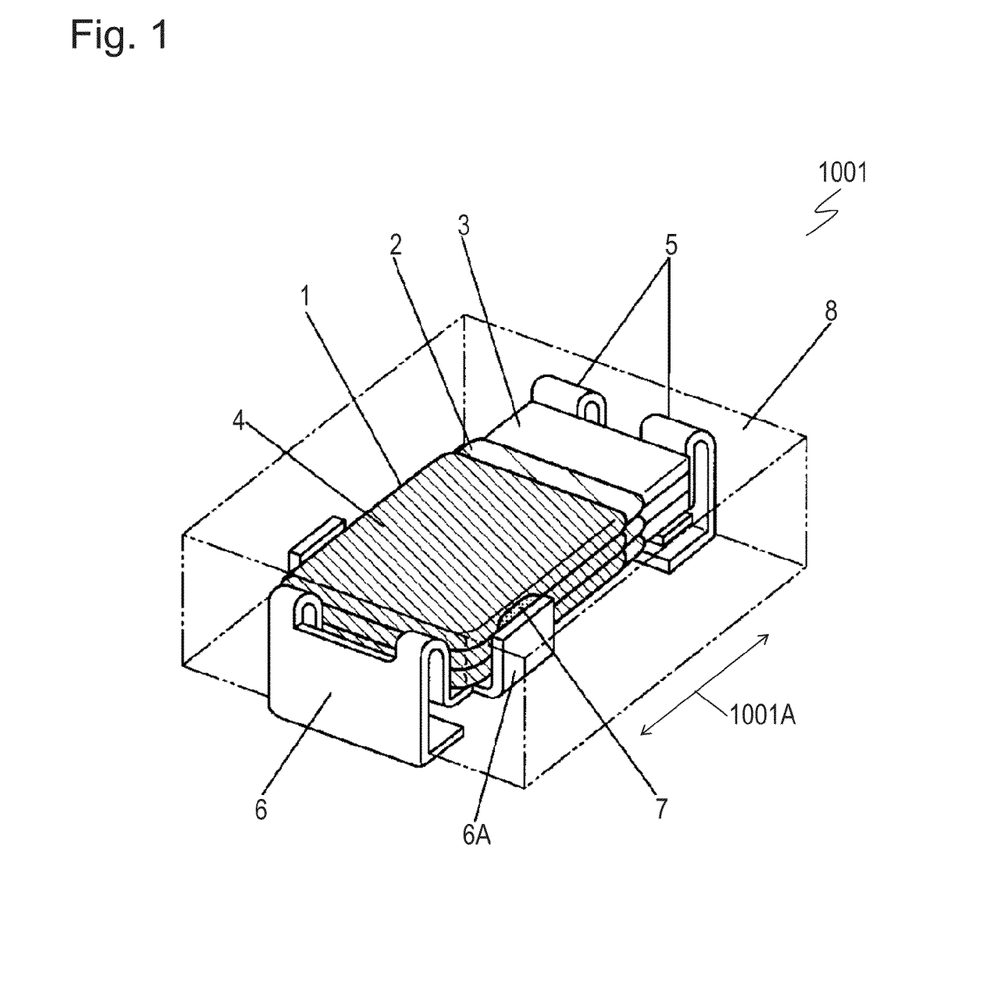
FIG. 1 is a perspective view of an electrolytic capacitor in accordance with an exemplary embodiment of the present invention.

FIG. 1 is a perspective view of electrolytic capacitor 1001 in accordance with an exemplary embodiment of the present invention. Electrolytic capacitor 1001 is a solid electrolytic capacitor that uses a solid electrolyte. Electrolytic capacitor 1001 includes a plurality of capacitor elements 1 that are stacked.

Figure 2A:
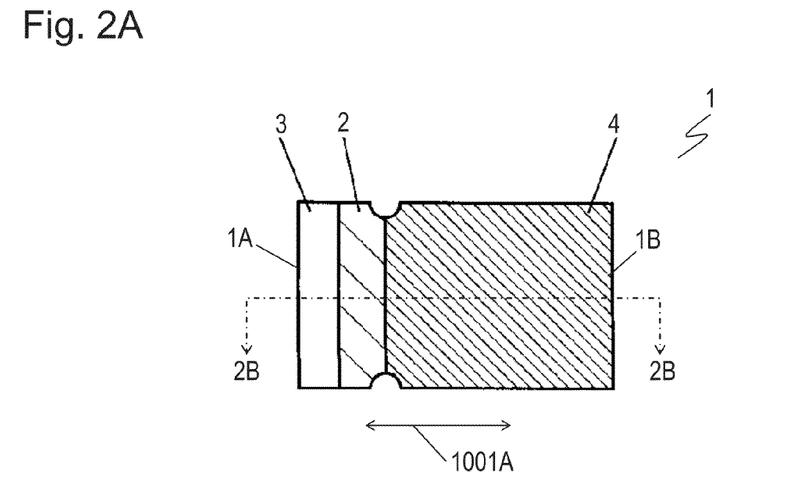
FIG. 2A is a plan view of a capacitor element of the electrolytic capacitor in accordance with the embodiment.
Figure 2B:
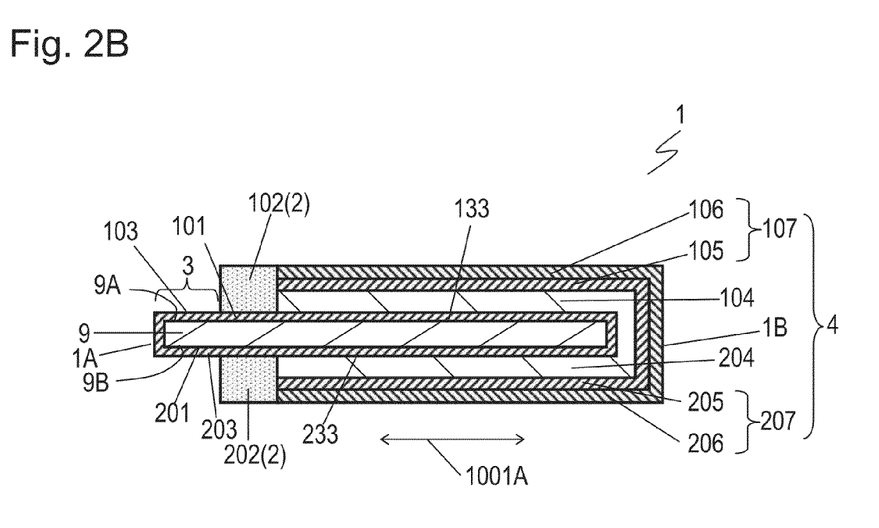
FIG. 2B is a cross-sectional view of the capacitor element taken along line 2B-2B shown in FIG. 2A.

FIG. 2A is a plan view of capacitor element 1 of electrolytic capacitor 1001. FIG. 2B is a cross-sectional view of capacitor element 1 taken along line 2B-2B shown in FIG. 2A. Electrode foil 9, an anode made of valve metal, such as aluminum, has a substantially rectangular shape extending in longitudinal direction 1001A, and has upper surface 9A and lower surface 9B opposed to each other. Dielectric oxide layers 101 and 201 are provided on upper surface 9A and lower surface 9B of electrode foil 9, respectively. Insulating upper resist 102 is formed on an upper surface of dielectric oxide layer 101. Upper resist 102 separates the upper surface of dielectric oxide layer 101 into anode portion 103 and cathode formation portion 133 along longitudinal direction 1001A. Solid electrolytic layer 104 made of a conductive polymer is formed on cathode formation portion 133. Carbon layer 105 is formed on an upper surface of solid electrolytic layer 104. Upper silver paste layer 106 is formed on an upper surface of carbon layer 105. Carbon layer 105 and silver paste layer 106 constitute cathode layer 107 placed on the upper surface of solid electrolytic layer 104. Insulating lower resist 202 is formed on a lower surface of dielectric oxide layer 201. Lower resist 202 separates the lower surface of dielectric oxide layer 201 into anode portion 203 and cathode formation portion 233 along longitudinal direction 1001A. Solid electrolytic layer 204 made from a conductive polymer is formed on cathode formation portion 233. Carbon layer 205 is formed on a lower surface of solid electrolytic layer 204. Silver paste layer 206 is formed on a lower surface of carbon layer 205. Carbon layer 205 and silver paste layer 206 constitute cathode layer 207 that is placed on the lower surface of solid electrolytic layer 204. Solid electrolytic layers 104 and 204 and cathode layers 107 and 207 constitute cathode portion 4. Anode portion 103 and anode portion 203 constitute anode portion 3. Upper resist 102 and lower resist 202 constitute resist unit 2. Each capacitor element 1 has a flat-plate shape on which anode portion 3 and cathode portion 4 are arranged along longitudinal direction 1001A with resist unit 2 provided between portions 3 and 4. Anode portion 3 and cathode portion 4 are attached to end portion 1A and end portion 1B of capacitor element 1 opposite to each other along longitudinal direction 1001A.

Capacitor elements 1 are stacked on anode common terminal 5, and anode portions 3 are joined to one another by a joining method, such as a laser welding. More specifically, portions of dielectric oxide layers 101 and 201 of each anode portion 3 are broken by welding so that electrode foil 9 is joined to anode common terminal 5 so as to be electrically connected to anode common terminal 5.

Stacked capacitor elements 1 are mounted on an element mounting portion of cathode common terminal 6. Cathode portions 4 of capacitor elements 1 are joined to each other with a conductive adhesive to be electrically connected. Cathode common terminal 6 has bent portions 6A that are formed by bending two sides of the element mounting portion upward. Bent portions 6A and cathode portion 4 are joined with conductive adhesive 7 so as to be electrically connected to each other.

Capacitor elements 1, anode common terminal 5, and cathode common terminal 6 are unitarily covered coated with insulating package resin 8 while respective portions of anode common terminal 5 and cathode common terminal 6 exposed to an outer surface. The portions of anode common terminal 5 and cathode common terminal 6 which are extended outside from package resin 8 are bent toward a bottom surface along package resin 8, and extend along package resin 8. Anode common terminal 5 and cathode common terminal 6 constitute an anode terminal portion and a cathode terminal portion on the bottom surface portion of package resin 8, respectively, providing surface mounted type of electrolytic capacitor 1001.

Figure 3:
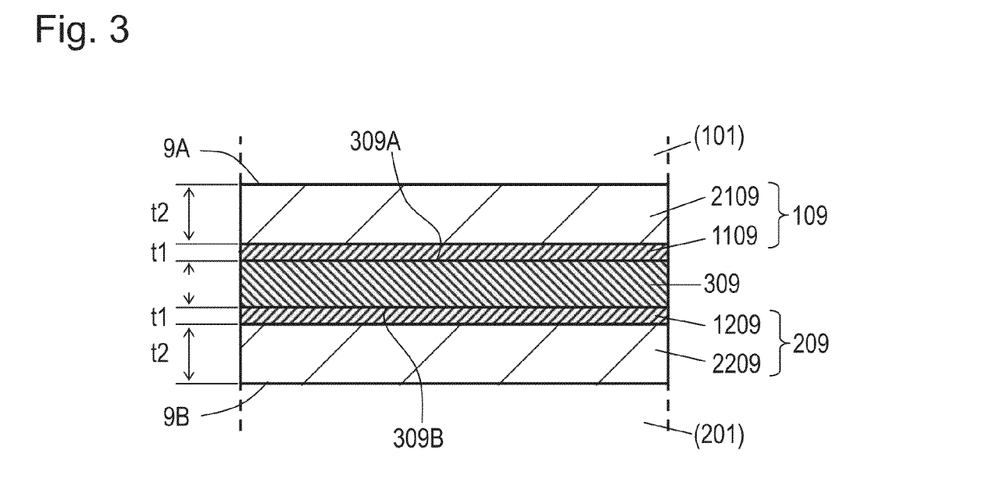
FIG. 3 is a cross-sectional view of an electrode foil of the capacitor element in accordance with the embodiment.

FIG. 3 is a cross-sectional view of electrode foil 9 of capacitor element 1. Electrode foil 9 includes substrate 309 made of an aluminum foil, rough-surface layer 109 formed on upper surface 309A of substrate 309 by vapor deposition, and rough-surface layer 209 formed on lower surface 309B of substrate 309 by vapor deposition. Dielectric oxide layer 101 is formed on a surface of rough-surface layer 109 serving as upper surface 9A of electrode foil 9. Dielectric oxide layer 201 is formed on a lower surface of rough-surface layer 209 serving as lower surface 9B of electrode foil 9. Surfaces 309A and 309B of substrate 309 substantially have no pores therein. Each of cover layers 2109 and 2209 has thickness t2 of several tens of micrometers, which is larger than thickness t1 of several micrometers of each of base layers 1109 and 1209.

Rough-surface layer 109 has base layer 1109 provided on upper surface 309A of substrate 309 and cover layer 2109 provided on the upper surface of base layer 1109. Rough-surface layer 109 may further include a layer which is provided on cover layer 2109 and which includes fine particles. In rough-surface layer 109 shown in FIG. 3, cover layer 2109 is the outermost layer of electrode foil 9, hence allowing upper surface of cover layer 2109 to correspond to upper surface 9A of electrode foil 9. Rough-surface layer 209 includes base layer 1209 provided on lower surface 309B of substrate 309 and cover layer 2209 provided on a lower surface of base layer 1209. Rough-surface layer 209 may further include a layer which is provided on cover layer 2209 and which includes fine particles. In rough-surface layer 209 shown in FIG. 3, cover layer 2209 is the outermost layer of electrode foil 9, hence allowing the lower surface of cover layer 2209 to correspond to lower surface 9B of electrode foil 9.

Figure 4:
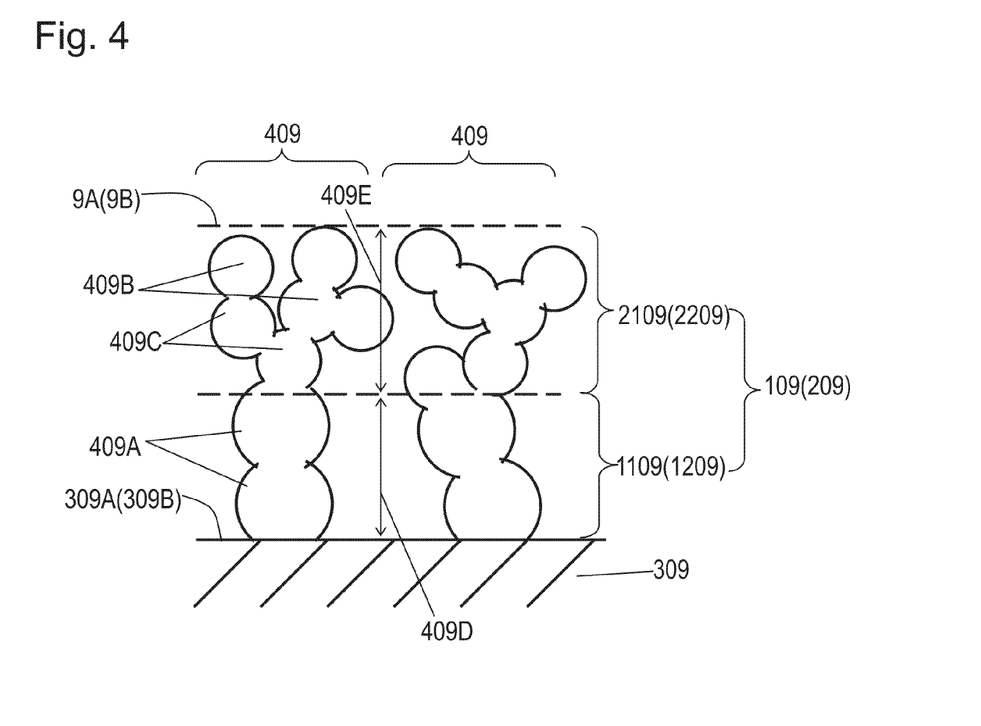
FIG. 4 is a schematic view of a rough-surface layer of the electrode foil in accordance with the embodiment.
Figure 5A:
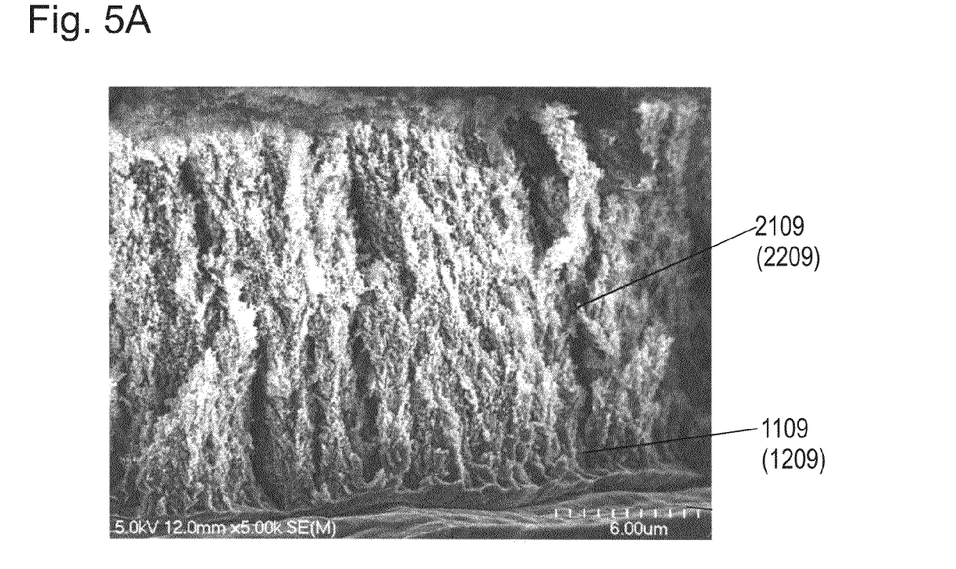
FIG. 5A is an enlarged view of the electrode foil shown in FIG. 3.
Figure 5B:
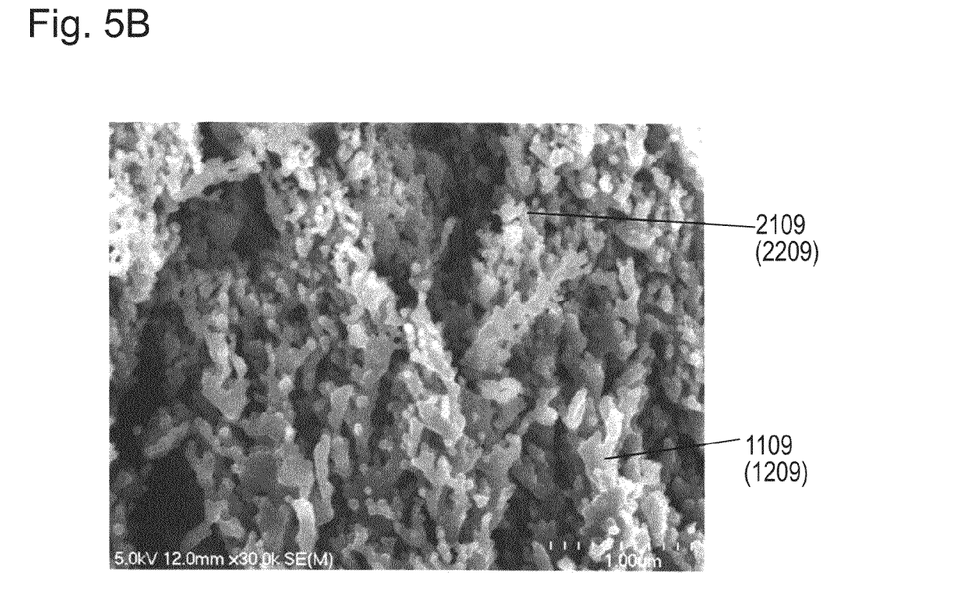
FIG. 5B is an enlarged view of the electrode foil shown in FIG. 5A.

FIG. 4 is a cross-sectional schematic view of rough-surface layers 109 and 209. FIGS. 5A and 5B are enlarged views of rough-surface layers 109 and 209 and are photographs taken with a scanning electron microscope (SEM) at magnifications of 5000 and 30000, respectively. As shown in FIGS. 4, 5A and 5B, each of rough-surface layers 109 and 209 includes plural tree structures 409 made of fine particles and extending from upper surface 309A and lower surface 309B of substrate 309 to upper surface 9A and lower surface 9B. Each tree structure 409 includes plural of fine particles 409A and 409C made of valve metal, such as aluminum, that are connected to one another. Tree structure 409 of rough-surface layer 109 (209) extends from upper surface 309A (lower surface 309B) of substrate 309 to upper surface 9A (lower surface 9B) while being branched into plural twigs 409B.

Tree structure 409, that is, base layer 1109 (1209) of rough-surface layer 109 (209), includes fine particles 409A, and cover layer 2109 (2209) includes fine particles 409C that are larger than fine particles 409A. Thus, larger fine particles 409A are connected to one after another from surfaces 309A and 309B of substrate 309 to form base layers 1109 and 1209. Moreover, smaller fine particles 409C are further connected to one another while plural twigs 409B including fine particles 409A, thus providing cover layers 2109 and 2209.

In other words, rough-surface layers 109 and 209 includes tree structures 409 that extend from surfaces 309A and 309B of substrate 309. Each of tree structures 409 includes root portion 409D that extends from surface 309A (309B) of substrate 309 and tip portion 409E that extends from root portion 409D. Fine particles 409A are connected to one after another from surface 309A (309B) of substrate 309 so as to form root portion 409D. Fine particles 409C are connected to one after another, while being branched into plural twigs 409B from root portion 409D, so as to form tip portion 409E.

A method for manufacturing electrode foil 9 will be described below.

Substrate 309 made of valve metal foil is placed inside a vapor deposition chamber which is kept in vacuum at 0.01 Pa to 0.001 Pa. Next, an ambient gas containing 1 part by volume of an active gas composed of oxygen gas and 4 to 6 parts by volume of an inert gas composed of argon gas is introduced to a periphery of substrate 309 while the pressure around substrate 309 is kept at 10 Pa to 20 Pa and the temperature of substrate 309 is kept in a range from 150° C. to 200° C. In this condition, an aluminum pellet serving as a vapor deposition source is placed inside the vapor deposition chamber, and aluminum is vapor-deposited on surfaces 309A and 309B of substrate 309, thereby forming base layers 1109 and 1209 of rough-surface layers 109 and 209 including fine particles 409A made of aluminum.

Next, an ambient gas containing 1 part by volume of an active gas composed of oxygen gas and 2 to 4 parts by volume of an inert gas composed of argon gas is introduced to the periphery of substrate 309 while the pressure around substrate 309 is kept at 20 Pa to 30 Pa and the temperature of substrate 309 is kept in a range from 150° C. to 200° C. In this condition, an aluminum pellet serving as a vapor deposition source is placed inside the vapor deposition chamber, and aluminum is vapor-deposited on base layers 1109 and 1209, thereby forming cover layers 2109 and 2209 including fine particles 409C made of aluminum. In the embodiment, substrate 309 is a foil made of a high-purity aluminum having a thickness of 50 μm. Before the introducing of the ambient gas, the pressure of vacuum is adjusted to 0.004 Pa. The ambient gas for forming the base layer is composed of 1 part by volume of oxygen gas and 4 parts by volume of argon gas. The flow rate of the ambient gas is adjusted so that, after the introduction of the ambient gas, the pressure around substrate 309 becomes 20 Pa. The temperature of substrate 309 is set to 300° C. Moreover, the ambient gas for forming the cover layer is composed of 1 part by volume of oxygen gas and 4 parts by volume of argon gas. The flow rate of the ambient gas is adjusted so that, after the introduction of the ambient gas, the pressure around substrate 309 becomes 20 Pa. The temperature of substrate 309 is set to 200° C.

In order to densely distribute the fine particles made of valve metal, such as aluminum, to be used for forming rough-surface layers 109 and 209, the diameters of the fine particles are made smaller. In the case where the diameters of the fine particles are identical to each other from surfaces 309A and 309B to surfaces 9A and 9B, the contact area at which the root portions of the tree structures contacts substrate 309 is small, hence preventing the tree structure, that is, rough-surface layer, from adhering substrate 309 tightly.

The average particle diameter of fine particles 409A of base layers 1109 and 1209 of rough-surface layers 109 and 209 is set to 0.2 μm, which is larger than the average particle diameter of 0.03 μm of fine particles 409C of cover layers 2109 and 2209. Since larger fine particles 409A exert greater kinetic energy upon vapor deposition, fine particles 409A are deposited while causing surfaces 309A and 309B of substrate 309 to melt, thereby forming base layers 1109 and 1209. This process increases the contact area between the root portions of tree structures 409 and surfaces 309A and 309B of substrate 309, and accordingly, allows tree structures 409 to be joined to surfaces 309A and 309B of the substrate with higher mechanical strength, thus causing surfaces 309A and 309B of substrate 309 to firmly adhere to base layers 1109 and 1209 of rough-surface layers 109 and 209, that is, to rough-surface layers 109 and 209. The average particle diameter of fine particles 409A of base layers 1109 and 1209 is not smaller than 0.1 μm to provide the above-mentioned effects. Moreover, before the forming of base layers 1109 and 1209, surfaces 309A and 309B of substrate 309 may be cleaned by a surface treatment, such as an $O_2$ ashing treatment, and then, fine particles 409A are vapor-deposited on surfaces 309A and 309B so that substrate 309 is adhere more firmly to rough-surface layers 109 and 209. Thickness t2 of cover layers 2109 and 2209 is several tens of micrometers, which is larger than thickness t1 of several micrometers of base layers 1109 and 1209. Since cover layers 2109 and 2209 that are exposed to surfaces 9A and 9B of electrode foil 9 greatly contribute to the capacitance of capacitor element 1, the thickness thereof is desirably large. Since base layers 1109 and 1209 that are not exposed to surfaces 9A and 9B of electrode foil 9 hardly contribute to the capacitance of capacitance element 1, the thickness thereof is desirably made smaller. As shown in FIG. 5A, since base layers 1109 and 1209 as well as cover layers 2109 and 2209 are continuously formed in the same vapor deposition chamber with fine particles 409A and 409C that are made of the same metal, borders between each of base layers 1109 and 1209 and each of cover layers 2109 and 2209 do not appear clearly.

Figure 6:
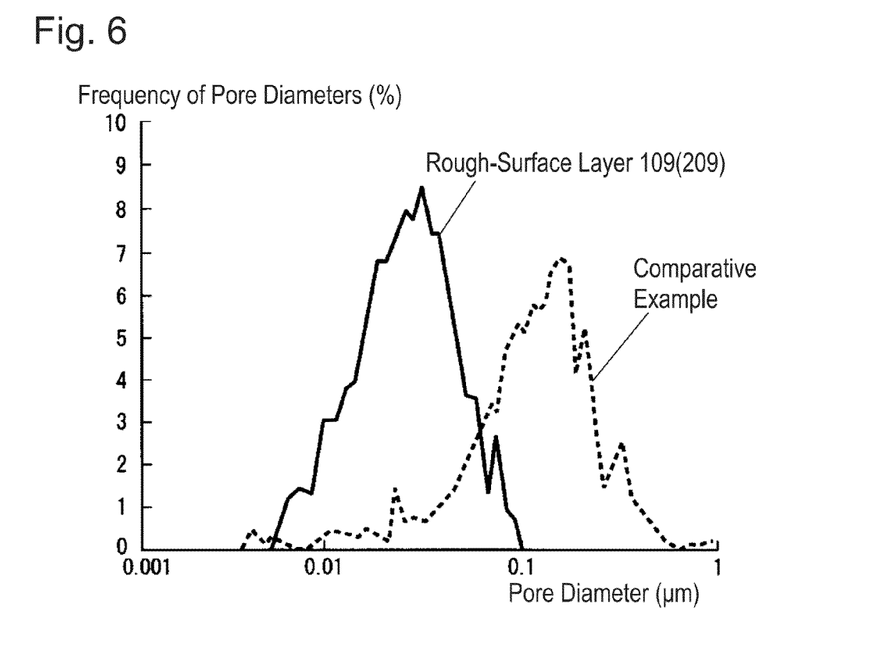
FIG. 6 is a graph illustrating a distribution of pore diameters of the roughened surface of the electrode foil in accordance with the embodiment.

FIG. 6 shows a distribution of pore diameters of cover layers 2109 and 2209 of rough-surface layers 109 and 209 manufactured by the above-mentioned method. FIG. 6 also shows a distribution of pore diameters of a rough-surface layer of a comparative example which are formed in the substrate made of aluminum foil by etching. In FIG. 6, the abscissas axis indicates the pore diameters, while the ordinates avis indicates the frequency of the diameters of pores. The mode of the pore diameters of cover layers 2109 and 2209 of rough-surface layers 109 and 209 in the embodiment is 0.03 μm, which is very fine, and is much finer than the mode of 0.15 μm of the pore diameters of a rough-surface layer of the comparative example. The surface area of electrode foil 9 is extremely large because of cover layers 2109 and 2209 of rough-surface layers 109 and 209.

According to in the embodiment, during the processes for forming cover layers 2109 and 2209, the ratio between the oxygen gas and the argon gas, the pressure of the peripheral portion and the temperature of substrate 309 are different from those of the processes for forming base layers 1109 and 1209. Consequently, the kinetic energy and surface active degree of each fine particle 409C can be smaller than those of fine particle 409A, and prevents fine particles 409C from growing more than fine particles 409, hence allowing fine particles 409C to be smaller than fine particles 409A.

In base layers 1109 and 1209 as well as in cover layers 2109 and 2209, fine particles 409A are joined to each other, and fine particles 409C are joined to each other. Therefore, on a cross section along a stacking direction in which base layers 1109 and 1209 as well as cover layers 2109 and 2209 are stacked, there are many necking portions at which fine particles 409A and 409C are joined to each other, among fine particles 409A and 409C, and may prevent measure individual particle diameters of fine particles 409A and 409C from being measured. In this case, an image of an SEM photograph of a cross section of each of fine particles 409A and 409C taken perpendicularly to the stacking direction is processed so that the average particle diameter of fine particles 409A and 409C can be easily measured.

In rough-surface layers 109 and 209 of electrode foil 9 in accordance with the embodiment, each of tree structures 409 extends to surfaces 9A and 9B from surfaces 309A and 309B of substrate 309, while being branched into plural twigs 409B. Moreover, many thin twigs 409B including finer particles 409C are exposed to surfaces 9A and 9B to form cover layers 2109 and 2209. Therefore, rough-surface layers 109 and 209 can be impregnated with more liquid, such as a polymer liquid.

Moreover, in tree structures 409 of rough-surface layers 109 and 209, since individual fine particles 409A and 409C are tightly joined to each other, each necking portion at which tree structure 409 is joined to substrate 309 is prevented from being damaged. With this arrangement, upon anodizing to form dielectric oxide layers 101 and 201, the necking portion is prevented from damage, and consequently to make the mechanical strength of electrode foil 9 greater, as well as suppressing a reduction in the capacitance of finished electrolytic capacitor 1001.

Additionally, upon forming base layers 1109 and 1209, fine particles 409A may be vapor-deposited without introducing oxygen gas and argon gas into the vapor deposition chamber.

After base layers 1109 and 1209 have been formed, the ratio between argon gas and oxygen gas in the ambient gas, the pressure of the ambient gas, and the temperature of substrate 309 are switched so that fine particles 409C are deposited to form cover layers 2109 and 2209. In rough-surface layers 109 and 209 of the embodiment, the diameters of fine particles of base layers 1109 and 1209 as well as cover layers 2109 and 2209 may be made gradually smaller, not in two stages, but in more stages greater than two stages. The pressure around substrate 309 is set in a range from 20 Pa to 30 Pa, while the amount of argon gas being set in a range from 2 to 4 parts by volume relative to 1 part by volume of oxygen gas in the ambient gas, the temperature of substrate 309 may be gradually changed step by step in a range from 150° C. to 200° C. This process causes the diameter (average particle diameter) of the fine particles of rough-surface layers 109 and 209 to be gradually smaller from surfaces 309A and 309B toward surfaces 9A and 9B. That is, the average particle diameter of fine particles 409C is gradually smaller step by step, in three or more stages, in a direction from substrate 309 toward the surface of rough-surface layer 109 or 209.

Characteristics of electrode foil 9 will be described in detail below.

Electrode foils 9 including rough-surface layers 109 and 209 having various modes of pore diameters were manufactured. An electrode foil of a comparative example having a rough-surface layer formed by etching was manufactured. Each of these electrode foils was put into an aqueous solution of 7% ammonium adipate at 70° C., and held for only a holding period of time of 20 minutes at an anodizing voltage 5 V and an anodizing current of 0.05 A/cm² so as to be anodized to provide dielectric oxide layers 101 and 201 on the surfaces of fine particles 409A and 409C. A sample piece having an area of 10 cm² was taken from electrode foil 9 on which dielectric oxide layers 101 and 201 are formed, and put into an 8% aqueous solution of ammonium borate at 30° C., and the capacitance as an anodization capacitance was measured at a measuring frequency of 120 Hz with an impedance analyzer.

Figure 7:
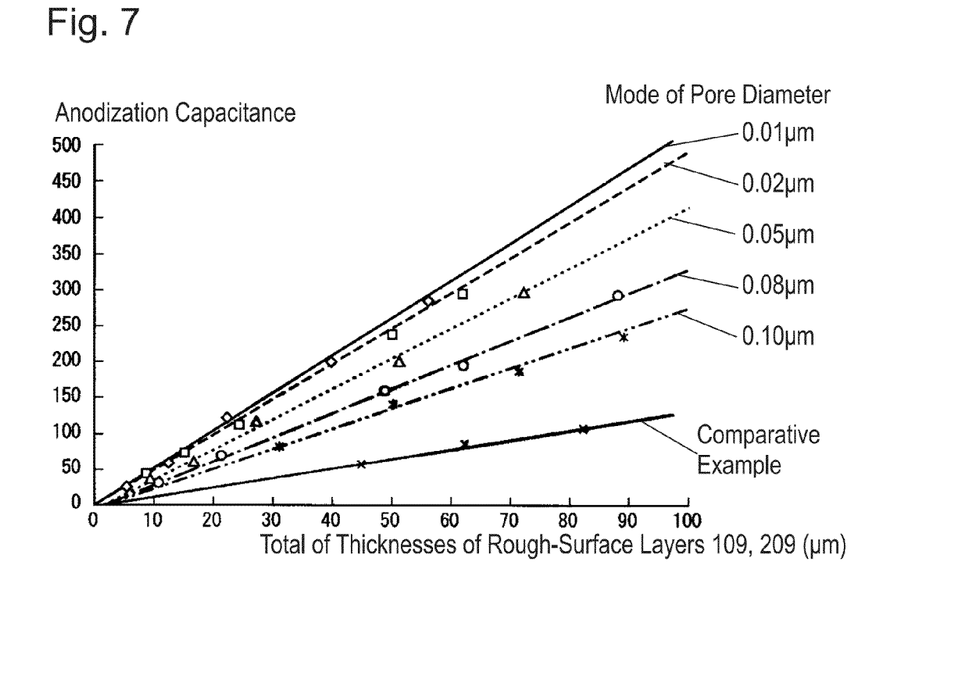
FIG. 7 is a graph illustrating a relationship between the thickness and an anodization capacitance rate of the rough-surface layer in accordance with the embodiment.

FIG. 7 shows the relationship between the total of the thickness of rough-surface layer 109 and the thickness of rough-surface layer 209 of electrode foil 9 and the anodization capacitance. In FIG. 7, the anodization capacitance of the electrode foil is indicated as the ratio of the anodization capacitance to the anodization capacitance of the electrode foil of the comparative example while the total of the thicknesses of the two rough-surface layers of the comparative example is set to 80 µm in a unit of percentage.

In order to cause substrate 309 to adhere rough-surface layers 109 and 209 tightly, fine particles 409A forming base layers 1109 and 1209 have a large particle diameter, while the thicknesses of base layers 1109 and 1209 are very small, thus not contribute to the capacitance of capacitor element 1. Moreover, in the embodiment, as the pore diameter becomes smaller, the average particle diameter of fine particles 409C of cover layers 2109 and 2209 becomes smaller.

As shown in FIG. 7, as the mode of the pore diameter becomes smaller, that is, as the average particle diameter of fine particles 409C of cover layers 2109 and 2209 becomes smaller, the anodization capacitance becomes larger in proportion to the thickness of rough-surface layer. Electrode foil 9 of the embodiment has a larger anodization capacitance in the same thickness of rough-surface layer in comparison with the electrode foil of the comparative example. This result is derived from the fact that, since the pore diameter of electrode foil 9 is smaller than that of the electrode foil of the comparative example, the ratio of the surface area to the size of the electrode foil becomes larger. Therefore, electrode foil 9 of the embodiment provides electrolytic capacitor 1001 that has a capacitance in the electrode foil larger than that of the electrode foil of the comparative example, and is thinner than that of the comparative example. Moreover, in electrode foil 9 of the embodiment, substrate 309 and rough-surface layers 109 and 209 adhere to one another firmly by base layers 1109 and 1209. Therefore, electrolytic capacitor 1001 including thin electrode foil 9 has a small size with a large capacitance and also achieves high reliability.

In electrode foil 9, the electrode foil of the embodiment including rough-surface layers 109 and 209 formed on surfaces 309A and 309B of substrate 309 may have a structure in which rough-surface layer 109 is only formed on surface 309A out of surfaces 309A and 309B of substrate 309, and rough-surface layer 209 is not necessarily formed on surface 309B. Even in this case, in rough-surface layer 109, the same effects as described above obtained in electrode foil 9 can be achieved.

Figure 8:
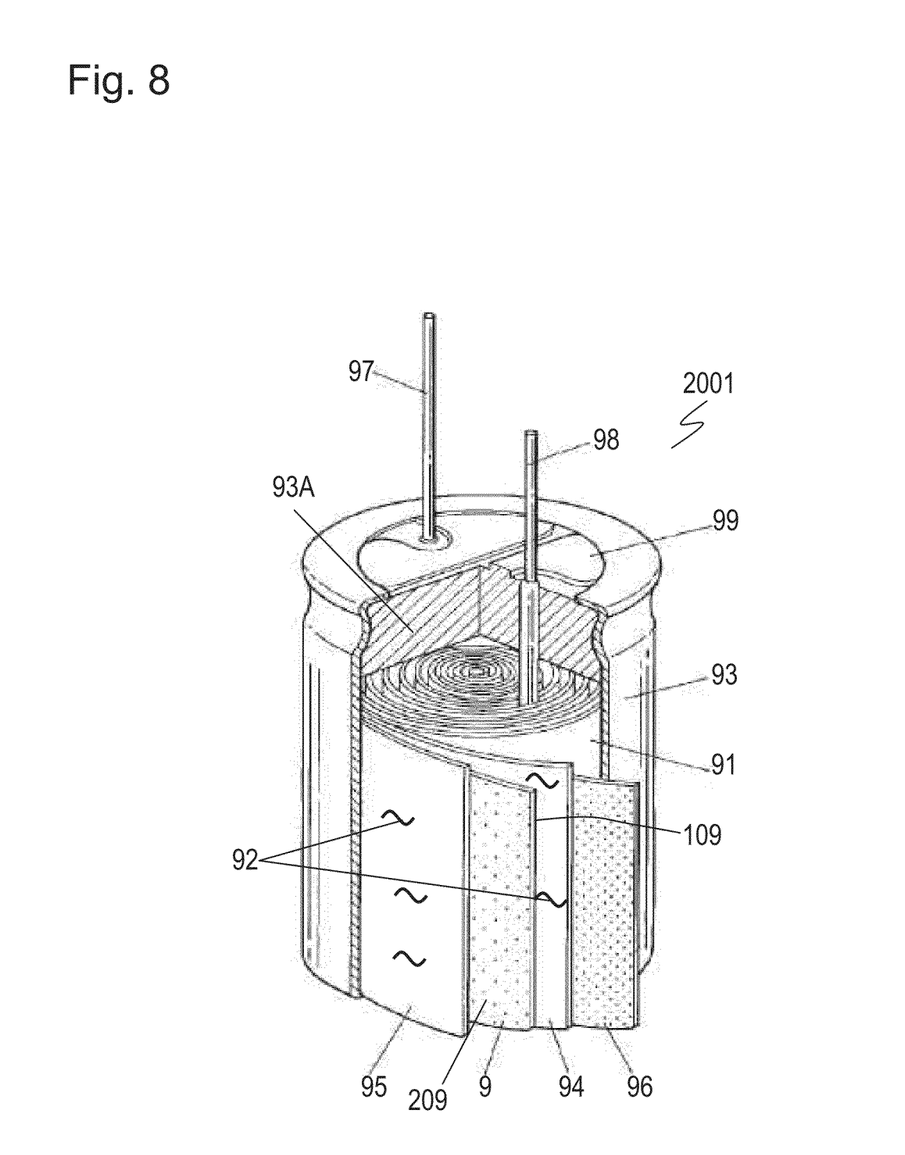
FIG. 8 is a partially exploded perspective view of another electrolytic capacitor in accordance with the embodiment.

FIG. 8 is a partially exploded perspective view of another electrolytic capacitor 1002 in accordance with the embodiment. Electrolytic capacitor 2001 is an electrolytic capacitor that uses an electrolyte solution.

Electrolytic capacitor 2001 includes capacitor element 91, electrolyte 92, and case 93 that houses capacitor element 91 and electrolyte 92. Capacitor element 91 includes electrode foil 9, dielectric oxide layers 101 and 201 provided on the surfaces of rough-surface layers 109 and 209 of electrode foil 9, separator 94 facing dielectric oxide layer 101, separator 95 facing dielectric oxide layer 201, and further electrode foil 96 facing dielectric oxide layers 101 and 201 across separators 94 and 95, respectively. Electrode foils 9 and 96 and separators 94 and 95 are rolled. Separators 94 and 95 are impregnated with electrolyte 92 contacting dielectric oxide layers 101 and 201. Electrode foil 9 functions as the anode of capacitor 2001, and electrode foil 96 functions as the cathode. Separators 94 and 95 are made of an insulating porous material. Case 93 has opening 93A sealed with sealing rubber 99. Terminals 97 and 98 are connected to electrode foils 9 and 96, respectively, so as to allow the inside of case 93 to communicate with the outside thereof through sealing rubber 99. In other words, terminal 97 connected to electrode foil 9 serving as the anode functions as an anode terminal of electrolytic capacitor 2001. Similarly, terminal 98 connected to electrode foil 96 serving as the cathode functions as the cathode terminal of electrolytic capacitor 2001.

In electrolytic capacitor 2001 also, electrode foil 9 includes surface-roughened layers 109 and 209 having base layers 1109 and 1209 including fine particles 409A having a large particle diameter, and cover layers 2109 and 2209 including fine particles 409C having a particle diameter smaller than that of fine particles 409A. Electrode foil 9 is used as an anode so that rough-surface layers 109 and 209 can be produced stably by vapor deposition, thereby providing electrolytic capacitor 2001 with a large capacitance.

INDUSTRIAL APPLICABILITY

An electrode foil in accordance with the present invention is thin, and has a small size with a large capacitance, and also has high reliability so that it is effectively utilized for electrolytic capacitors in various fields.

EXPLANATION OF REFERENCE NUMERALS

109 Rough-surface layer
309 Substrate
409 Tree structure
409A Fine particle (first fine particle)
409C Fine particle (second fine particle)
409D Root portion
409E Tip portion
1109 Base layer
1209 Cover layer

The invention claimed is:
1. An electrode foil for a capacitor comprising:
a metal foil made of a valve metal and having two surfaces opposite to each other; and
a rough-surface layer including
a base layer provided on at least one surface of the two surfaces of the metal foil, the base layer including a plurality of first fine particles made of valve metal, and
a cover layer provided on the base layer, the cover layer including a plurality of second fine particles made of valve metal,
wherein the plurality of first fine particles have an average particle diameter larger than an average particle diameter of the plurality of second fine particles,
wherein a thickness of the cover layer is larger than a thickness of the base layer.
2. The electrode foil for a capacitor according to claim 1, wherein the average particle diameter of the plurality of second fine particles becomes smaller step by step in a direction from the metal foil toward a surface of the rough-surface layer.
3. The electrode foil for a capacitor according to claim 1, wherein the cover layer includes a plurality of tree structures, each of the plurality of tree structures includes the plurality of second fine particles that are connected to one another from the base layer while being branched into a plurality of twigs.
4. The electrode foil for a capacitor according to claim 1, wherein the rough-surface layer includes a plurality of tree structures that extend from the at least one surface of the two surfaces of the metal foil, each of the tree structures includes:
a root portion that extends from the at least one surface of the two surfaces of the metal foil; and
a tip portion that extends from the root portion,
wherein the plurality of first fine particles are connected to one another from the at least one surface of the two surfaces of the metal foil to form the root portion, and
wherein the plurality of second fine particles are connected to one another from the root portion, while being branched into a plurality of twigs to form the tip portion.
5. An electrolytic capacitor comprising:
an electrode foil for a capacitor according to claim 1;
a dielectric oxide layer formed on a surface of the rough-surface layer;
a solid electrolytic layer provided on the dielectric oxide layer, the solid electrolytic layer being made of conductive polymer; and
a cathode layer provided on the solid electrolytic layer.
6. An electrolytic capacitor comprising:
a capacitor element including
an electrode foil for a capacitor according to claim 1,
a dielectric oxide layer formed on a surface of the rough-surface layer,
a separator facing the dielectric oxide layer, and
a further electrode foil facing the dielectric oxide layer while the separator is provided between the further electrode foil and the dielectric oxide layer;
an electrolyte with which the separator is impregnated; and
a case that houses the capacitor element and the electrolyte.
7. The electrolyte capacitor according to claim 6, wherein the electrode foil for a capacitor functions as an anode, and the further electrode foil functions as a cathode.
8. An electrolytic capacitor comprising:
a capacitor element including
an electrode foil for a capacitor according to claim 2,
a dielectric oxide layer formed on a surface of the rough-surface layer,
a separator facing the dielectric oxide layer, and
a further electrode foil facing the dielectric oxide layer while the separator is provided between the further electrode foil and the dielectric oxide layer;
an electrolyte with which the separator is impregnated; and
a case that houses the capacitor element and the electrolyte.
9. The electrolyte capacitor according to claim 8, wherein the electrode foil for a capacitor functions as an anode, and the further electrode foil functions as a cathode.
10. An electrolytic capacitor comprising:
a capacitor element including
an electrode foil for a capacitor according to claim 3,
a dielectric oxide layer formed on a surface of the rough-surface layer,
a separator facing the dielectric oxide layer, and
a further electrode foil facing the dielectric oxide layer while the separator is provided between the further electrode foil and the dielectric oxide layer;
an electrolyte with which the separator is impregnated; and
a case that houses the capacitor element and the electrolyte.

11. The electrolyte capacitor according to claim 10, wherein the electrode foil for a capacitor functions as an anode, and the further electrode foil functions as a cathode.

12. An electrolytic capacitor comprising:
a capacitor element including
an electrode foil for a capacitor according to claim 4,
a dielectric oxide layer formed on a surface of the rough-surface layer,
a separator facing the dielectric oxide layer, and
a further electrode foil facing the dielectric oxide layer while the separator is provided between the further electrode foil and the dielectric oxide layer;
an electrolyte with which the separator is impregnated; and
a case that houses the capacitor element and the electrolyte.

13. The electrolyte capacitor according to claim 12, wherein the electrode foil for a capacitor functions as an anode, and the further electrode foil functions as a cathode.

14. An electrolytic capacitor comprising:
an electrode foil for a capacitor according to claim 2;
a dielectric oxide layer formed on a surface of the rough-surface layer;
a solid electrolytic layer provided on the dielectric oxide layer, the solid electrolytic layer being made of conductive polymer; and
a cathode layer provided on the solid electrolytic layer.

15. An electrolytic capacitor comprising:
an electrode foil for a capacitor according to claim 3;
a dielectric oxide layer formed on a surface of the rough-surface layer;
a solid electrolytic layer provided on the dielectric oxide layer, the solid electrolytic layer being made of conductive polymer; and
a cathode layer provided on the solid electrolytic layer.

16. An electrolytic capacitor comprising:
an electrode foil for a capacitor according to claim 4;
a dielectric oxide layer formed on a surface of the rough-surface layer;
a solid electrolytic layer provided on the dielectric oxide layer, the solid electrolytic layer being made of conductive polymer; and
a cathode layer provided on the solid electrolytic layer.

17. The electrode foil according to claim 2, wherein a thickness of the cover layer in a direction away from the at least one surface of the two surfaces of the metal foil is larger than a thickness of the base layer in the direction.

18. The electrode foil according to claim 1, wherein the two surfaces of the metal foil are parallel to each other.

* * * * *